United States Patent [19]

Culbertson et al.

[11] Patent Number: 5,031,312
[45] Date of Patent: Jul. 16, 1991

[54] JIG FOR MAKING IMPROVED KELLEMS GRIP CONSTRUCTION FOR CABLE CONNECTOR AND METHOD OF ASSEMBLING

[75] Inventors: David L. Culbertson, New London, Conn.; Dennis M. Beckloff, Chesapeake, Va.

[73] Assignee: The United States of America as represented by the Secretary of the Navy, Washington, D.C.

[21] Appl. No.: 501,912

[22] Filed: Mar. 29, 1990

[51] Int. Cl.$^5$ .................. H01B 13/20; B23P 19/00
[52] U.S. Cl. ................................. 29/828; 29/748; 29/256; 29/753
[58] Field of Search .............. 29/251, 256, 266, 868, 29/464, 751, 828, 753, 517, 516, 748, 880; 439/880

[56] References Cited

U.S. PATENT DOCUMENTS

| | | | |
|---|---|---|---|
| 1,385,452 | 7/1921 | Hoffman | 29/256 |
| 2,485,022 | 10/1949 | Taylor | 29/251 X |
| 3,174,218 | 3/1965 | McConaha | 29/256 |
| 3,325,885 | 6/1967 | Ziegler, Jr. et al. | 129/256 X |
| 4,451,977 | 6/1984 | Matthews et al. | 29/748 |

FOREIGN PATENT DOCUMENTS 654230  12/1962  Canada .................. 29/753

Primary Examiner—Carl J. Arbes
Attorney, Agent, or Firm—Michael J. McGowan; Prithvi C. Lall

[57] ABSTRACT

A jig for assembling a Kellems grip connection on a coaxial cable has a pair of spaced members having aligned apertures extending therethrough and means for securing the two members with their apertures in alignment. One of the members is formed by a pair of abutting elements with opposed edges having recesses therein which cooperatively provide the aperture extending therethrough, and these elements also have cooperating elements on their faces which seat the end of the collapsible sleeve of a Kellems grip connector placed therebetween. The members are moved relative to each other to collapse the Kellems grip sleeve and effect its radial expansion to permit the feeding through the sleeve of bundles of reinforcing strands of the cable to a point where they can be looped about the Kellems grip mesh adjacent its connector element. Upon removal of the cable and Kellems grip connector from the jig, the bundles of reinforcing strands are initially looped about the inner sections in the Kellems grip sleeve and then fed within the sleeve to a point spaced from the connector element where they are again looped about the wires of the sleeve to produce effective interengagement between the reinforcing strands and the compression sleeve of the Kellems grip connector.

8 Claims, 4 Drawing Sheets

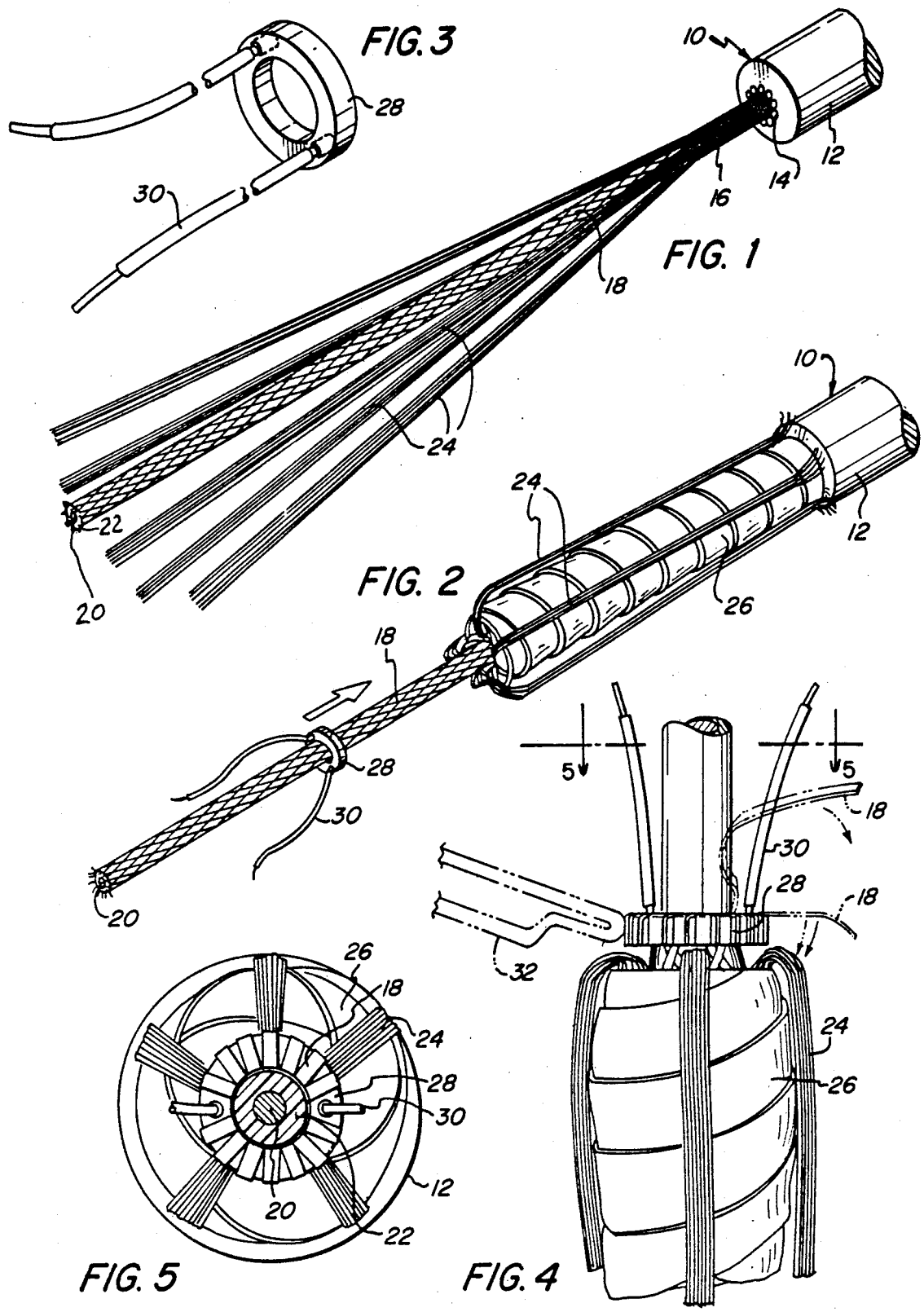

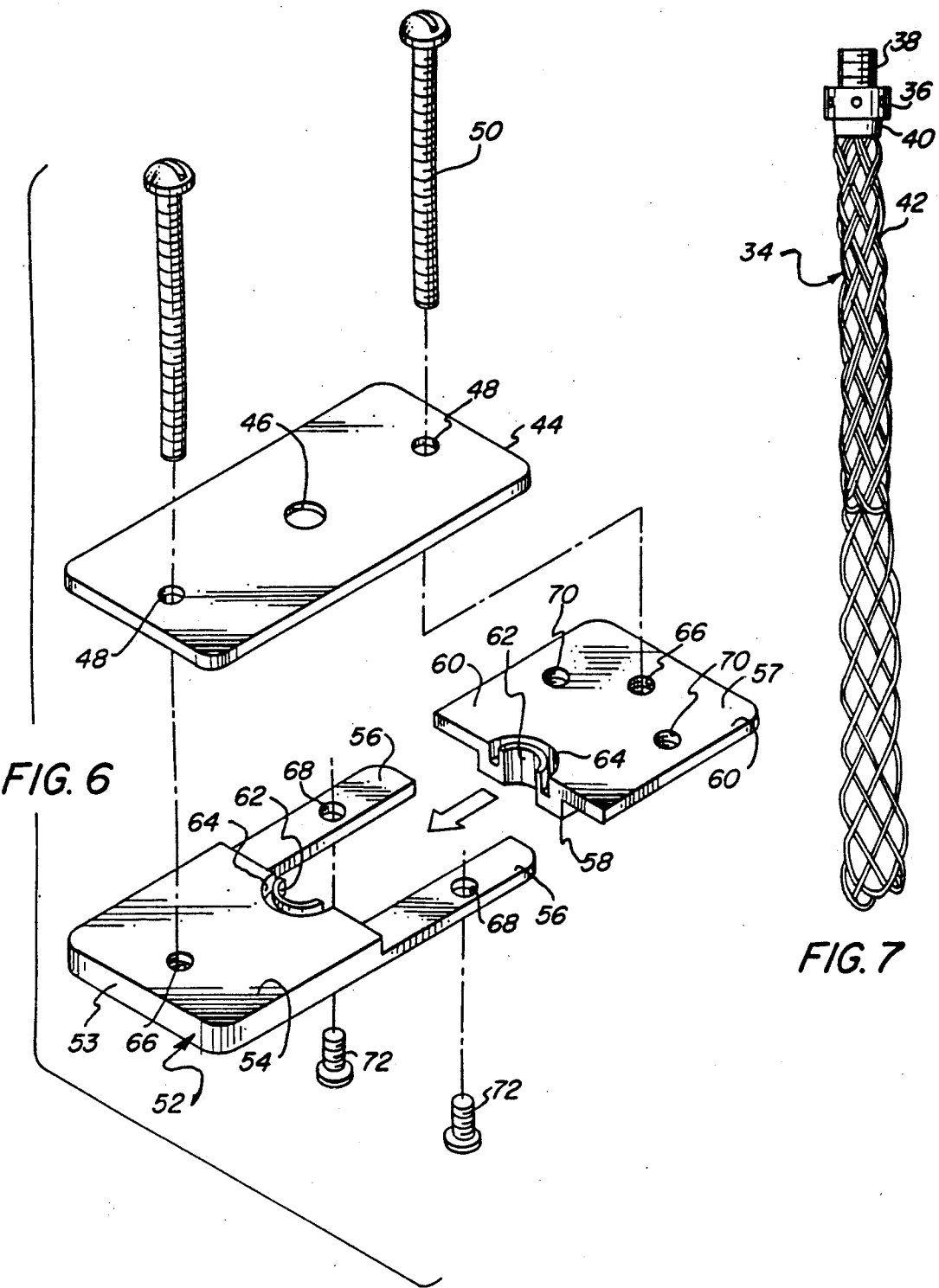

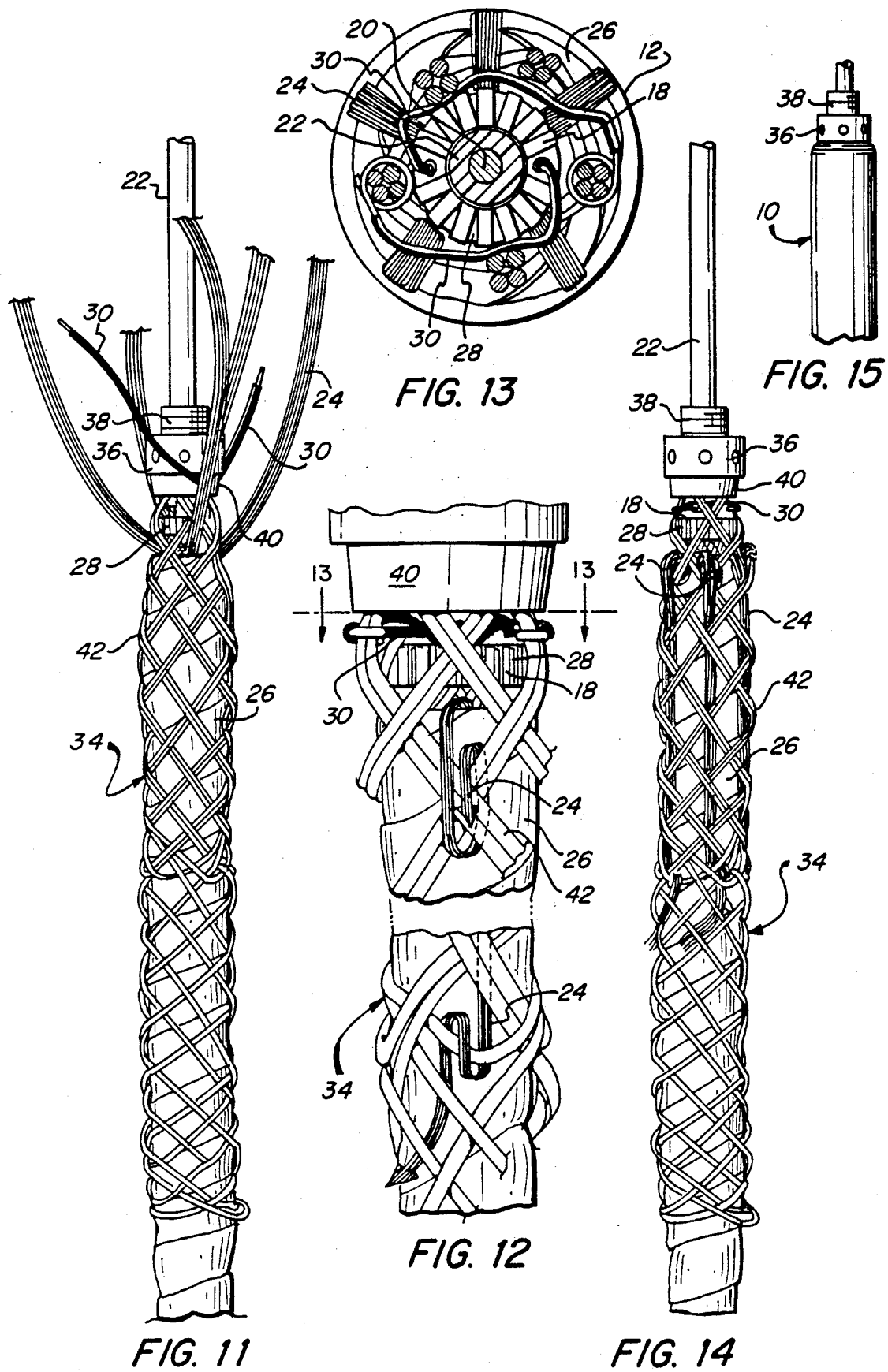

JIG FOR MAKING IMPROVED KELLEMS GRIP CONSTRUCTION FOR CABLE CONNECTOR AND METHOD OF ASSEMBLING

STATEMENT OF GOVERNMENT INTEREST

This patent application is co-pending with a related patent application Ser. No. 07/501,916 entitled "Improved Kellems Grip Construction for Cable Connector and Method of Using Same" by the same inventors filed on the same date as this patent application.

The invention described herein may be manufactured and used by or for the Government of the United States of America for Governmental purposes without the payment of any royalties thereon or therefor.

BACKGROUND OF THE INVENTION (1) Field of the Invention

The present invention relates to a jig for use in assembling a Kellems grip connector on coaxial cable, and the method for its use in such assembly.

(2) Description of the Prior Art

In a number of applications, there is a need to provide a high mechanical strength joint between the connector and coaxial cable as well as to provide good electrical properties at the joint. More particularly, it is desirable to maintain the strength of the cable itself to the point of the connector and to continue the shielding capability provided within the cable to the connector. Lastly, where the cable will be exposed to a hostile environment such as by immersion in salt water, it is desirable that the cable area adjacent the connector be substantially impervious to the environment.

To provide high mechanical strength connections between the connector and the cable, Kellems grip connectors are frequently employed. In such connectors, the connector element has attached thereto a wire mesh cylindrical sleeve which extends over the cable core. As is known, this type of sleeve will compress when it is stretched, and a tension load on the end of the cable near the connector will produce stretching and thereby increase the clamping action of the Kellems grip sleeve upon the underlying cable material. The use of such compression sleeves is described in the patent literature, including Crowl U.S. Pat. No. 3,622,685 and Zehren U.S. Pat. No. 4,296,548.

In some cables, axially extending reinforcing strands of high strength synthetic resin are employed to increase the overall strength of the cable and to limit its elongation.

In our co-pending application entitled "Improved Kellems Grip Construction for Cable Connector and Method of Using Same" there is described an improved method for securing a Kellems grip connector at the end of a coaxial cable to provide enhanced strength and effectively preserve the shielding provided by the metallic braid. In this method, the reinforcing strands in the cable are interengaged with the Kellems grip sleeve.

However, threading the reinforcing strands through the Kellems grip compression sleeve is difficult because the sleeve is dimensioned to fit snugly on the cable.

SUMMARY OF THE INVENTION

It is an object of the present invention to provide a novel and economical jig for use in assembling Kellems grip connectors on coaxial cable so as to facilitate the threading of the reinforcing strands through the sleeve.

It is also an object to provide such a jig which may be fabricated economically and which is simple to use.

Another object is to provide a novel method of assembling Kellems grip connectors on a cable using such a jig.

It has now been found that the foregoing and related objects may be readily attained in a jig to be used in assembling a Kellems grip connector on the end of a coaxial cable and which has a first member having an aperture therethrough and a second member formed by a pair of abutting cooperating elements. Aligned recesses in the opposed edges of the abutting elements cooperatively define an aperture therethrough, and the elements have cooperating means on their faces opposed to the first member which extend about the recesses for seating the end of the collapsible sleeve of a Kellems grip connector. The second member also includes means for releasably securing the cooperating elements in abutting assembly.

The first and second members are secured in assembly by suitable releasable means, with their apertures in alignment. As a result, a Kellems grip connector may be seated in the aperture of the first member and the remote end of its sleeve seated on the seating means of the second member with the cable extending through the aperture of the second member. The securing means is adapted to space the members apart a distance which will collapse the sleeve of the connector seated therebetween and thereby effect its radial expansion.

Desirably, the releasable securing means for the first and second members comprises fasteners extending therebetween and seated in apertures therein, and the apertures of one of the members are threaded so that the fasteners are threadably engaged therein to permit adjustment of the axial spacing therebetween the members.

Preferably, the seating means about the recesses comprises an aligned groove in each of the elements extending about the recess therein, and these grooves are desirably arcuate and cooperate to define a circle.

The first and second elements of the second member have cooperating configurations permitting their abutting engagement and their disassembly by motion of one relative to the other in a direction parallel to the plane of the first member. Desirably, one of the elements has a body portion and pair of laterally extending legs, and the other of the elements seats on the legs and has a rail portion extending therebetween.

Preferably, the legs are of lesser thickness than the body portion and the other element has wing portions on the sides of the rail portion which are of lesser thickness and which slidably seat on the legs. Conveniently, the one element is of generally U-shaped configuration and the second element has a T-shaped cross section, and the means for securing such cooperating elements in assembly comprises fasteners engaged in the pair of elements.

In the method for assembling a Kellems grip connector on a coaxial cable having a conductive core, a metallic braid thereabout, synthetic resin reinforcing strands outwardly of the braid and an outer sheath, a length of the outer sheath is removed from an end portion of the cable to be provided with the connector and this exposes the metallic braid and reinforcing strands. The exposed strands are formed into a multiplicity of bundles spaced about the periphery of the core and are folded upon themselves to extend away from the end of the cable. There is slid over the exposed core, a Kellems grip connector having a connector element at its outer end and a cylindrical mesh compression sleeve formed by interlaced wires. The mesh sleeve extends over the washer and the bundles of strands. The end portion of the cable with the Kellems grip connector thereon is placed in a jig having a pair of members spaced axially along the cable end portion, and this placement seats the Kellems grip connector element in an aperture in one of the members and seats the end portion of the cable in an aperture in the other of the members. This placement also seats the end of the sleeve on seating means on the face of the other member. The one member is moved towards the other member to a position in which the sleeve is collapsed axially and thereby its diameter is expanded, after which the members are secured in such collapsing position. The bundles of reinforcing strands are fed within the expanded sleeve towards the connector element and outwardly through peripherally spaced openings in the mesh sleeve adjacent the connector element. The pair of members of the jig are then released from engagement and the cable and Kellems grip connector are removed. Each one of the bundles is looped about a peripherally spaced intersection of the wires of the mesh sleeve adjacent the connector element and then fed axially under the mesh sleeve towards the end thereof spaced from the connector element. Each bundle is then looped about a peripherally spaced wire of the mesh sleeve adjacent the spaced end thereof, whereby the bundles of reinforcing strands are firmly interengaged with the mesh sleeve of the Kellems grip connector.

Normally, prior to the step of placing the Kellems grip connector thereon, there is included the step of placing a metallic washer over the exposed core and conductively bonding the metallic braid thereto. The other member of the jig is assembled about the cable by relative movement into abutting relationship of a pair of elements, the elements operatively defining the aperture therethrough.

BRIEF DESCRIPTION OF THE DRAWINGS

FIG. 1 is a fragmentary perspective view of the end of a coaxial cable from which the outer sheath and conductive fillers have been stripped exposing the reinforcing strands and metallic braid about the dielectric covered core;

FIG. 2 is a perspective view showing a portion of the stripped cable covered with a thermoplastic tape extending for a distance from the outer sheath, further showing the reinforcing strands formed as bundles which are folded inwardly over the tape, and lastly showing a conductive washer being inserted onto the conductive core;

FIG. 3 is a perspective view to an enlarged scale of the conductive washer seen in FIG. 2;

FIG. 4 is a fragmentary plan view showing the conductive washer disposed upon the core adjacent the inwardly folded bundles of reinforcing strands and showing in phantom line the tip of a soldering iron being used to solder the metallic braid to the conductive washer;

FIG. 5 is a sectional view along the line 5—5 of FIG. 4;

FIG. 6 is an exploded view of a jig embodying the present invention;

FIG. 7 is a plan view of a Kellems grip connector having a connector element at the one end and a wire mesh compression sleeve extending therefrom;

FIG. 11 shows the uncollapsed Kellems grip sleeve extending over the wrapped core, and the bundles of reinforcing strands extending outwardly through openings in the mesh of the Kellems grip sleeve;

FIG. 12 is a fragmentary plan view to an enlarged scale of the cable end showing the strand bundles as they are diagrammatically looped about and fed under the sleeve and also showing the hook up wires of the conductive washer bonded to the mesh sleeve of the connector;

FIG. 13 is a sectional view thereof to an enlarged scale along the line 13—13 of FIG. 12;

FIG. 14 is a fragmentary plan view of the connector prior to covering and molding; and FIG. 15 is a view of the covered and molded connection.

DESCRIPTION OF THE PREFERRED EMBODIMENT

Figure 8:
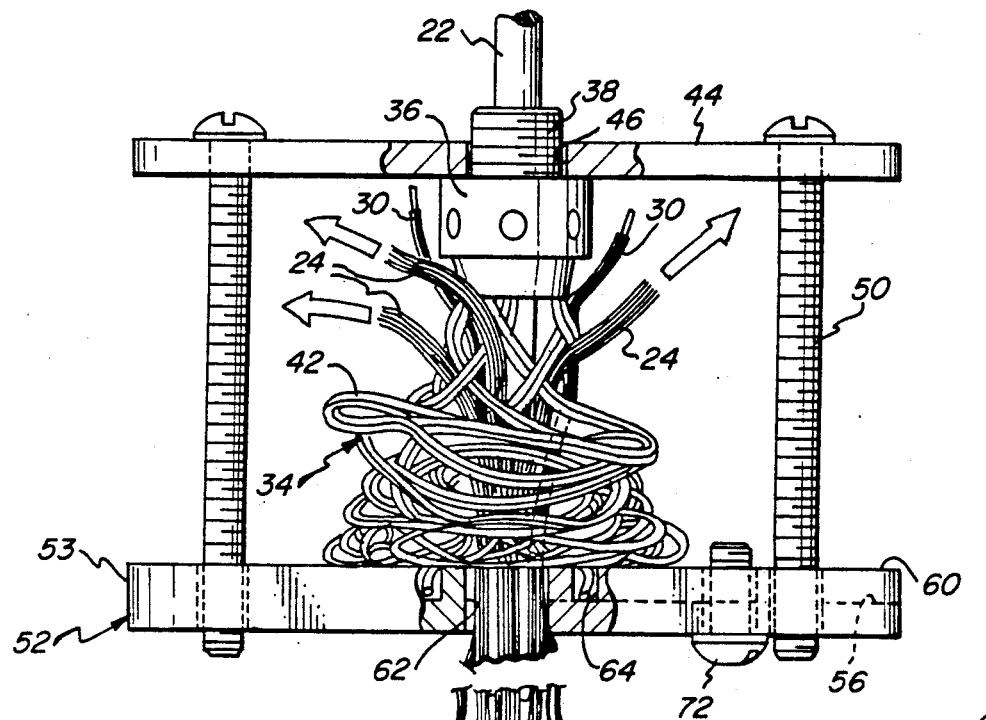
FIG. 8 is a partially diagrammatic view showing the cable of FIG. 4 and Kellems grip connector FIG. 7 assembled in the jig of FIG. 6 with the sleeve collapsed longitudinally, and diagrammatically showing the bundles being pulled therethrough.

Turning first to FIG. 1 of the drawings, therein illustrated is a coaxial cable of the type with which the present invention is employed, and generally designated by the numeral 10. It includes an outer sheath 12 of durable synthetic resin which contains fillers 14 such as elongated polyolefin elements of circular cross section, reinforcing strands 16 of high tensile strength synthetic resin (such as the aromatic polyamide sold by E.I. duPont deNemours under the trademark KEVLAR), a jacket 18 of copper braid, and a central core wire 20 surrounded by the dielectric resin coating 22. As is well known, it may also contain additional conductors, string to tie elements together, etc.

Before using the jig of the present invention, a series of steps are performed which will be initially described.

In FIG. 1, the cable 10 is shown after removing the sheath 12 and cutting the fillers 14. The reinforcing strands 16 have also been separated into five peripherally spaced bundles 24.

In FIG. 2, tape 26 of synthetic thermoplastic has been wound about the bundles 24, braid 18 and core 20 for a length substantially equal to the length of the Kellems grip sleeve (not shown), and the bundles 24 have been folded back onto the taped portion. A washer 28, of FIG. 3, having a pair of hook up wires 30 is shown in FIG. 2 as fitted over the braided jacket 18, and being moved towards the end of the taped portion.

In FIG. 4, the washer 28 is shown in position and the braided jacket 18 has been fanned out and folded over the periphery of the washer 28. At this point, the braided jacket 18 is soldered to the face and periphery of the washer 28 as indicated by the solder iron 32. The excess braided jacket 18 is thereafter trimmed, and the resultant structure is seen in end view in FIG. 5.

Turning next to FIG. 7, therein illustrated is a Kellems grip connector of the type which is used in the present invention and which is generally designated by the numeral 34. The connector element 36 has a threaded barrel portion 38 which will mate with and be threadably engaged with another connector element (not shown) and a collar portion 40 in which there is engaged one end of the compression sleeve 42 of interlaced wires forming an open mesh. The portion of the sleeve 42 adjacent the connector is formed by double wires to increase its strength whereas the remote portion is of single wire mesh construction. As is customary, the cable 10 will extend through the sleeve 42 and the core wire 20 will be engaged in the connector element 36.

In FIGS. 6 and 8-10, the jig is illustrated as is the manner in which it is used to facilitate the making of the connection. The jig is comprised of a first plate 44 having a central aperture 46 and a pair of outwardly spaced apertures 48 through which the elongated threaded fasteners 50 extend.

A second plate generally designated by the numeral 52 is formed from a generally U-shaped element 53 with a body portion 54 and a pair of legs 56 of lesser thickness than the body portion 54. Cooperating with the U-shaped element 53 is a second element 57 of generally T-shaped cross section provided by a relatively thick center rail 58 which slides between the legs 56 and the wings 60 which are of lesser thickness and slide on the surface of the legs 56.

The adjacent edges of the two elements 53,57 are formed with semi-cylindrical recesses 62 which mate to provide a circular aperture through the plate 52 when assembled in abutting relationship, and the elements 53,57 also have aligned arcuate grooves 64 in their inner faces which mate when assembled to define a circular channel about the circular aperture. Adjacent their outer ends, the elements 53, 57 have threaded apertures 66 which are aligned with the apertures 48 in the first plate 44. The legs 56 have apertures 68 therein which are aligned with the threaded apertures 70 in the wings 60 when the two elements 53,57 are assembled to seat the short threaded fasteners 72 and thereby lock the elements 53,57 in assembly.

In use of the jig, the bundles 24 are unfolded to extend axially about the washer 28 and along the cable 10 in peripherally spaced relationship, and the hook up wires 30 are also extended in diametrically spaced relationship. This subassembly is then inserted in between the elements 53,57 as to extend through the aperture formed by the semicircular recesses 62. After the elements 53,57 are moved into abutting relationship, they are secured by the fasteners 72.

The Kellems grip connector 34 is placed on the cable 10, and the hook up wires 30 and bundles 24 are fed into the open end of the sleeve 42 and the connector element 36. The end of the sleeve 42 is seated in the grooves 64 in the inner face of the second plate 52.

Figure 9:
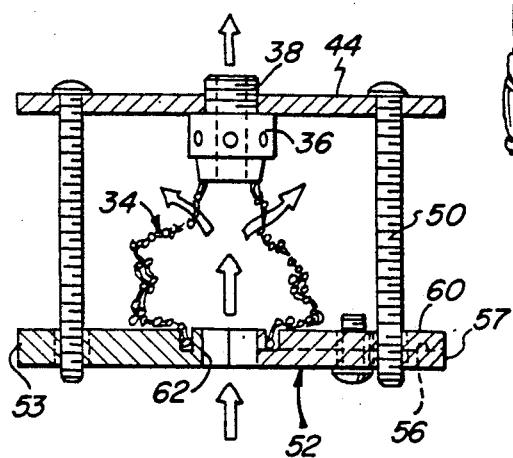
FIG. 9 is a diagrammatic view of the Kellems grip sleeve as expanded by longitudinal collapsing thereof.
Figure 10:
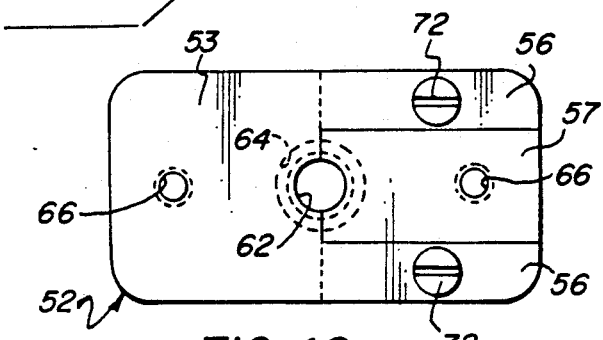
FIG. 10 is an end elevational view of the jig of FIGS. 6, 8 and 9.

The first plate 44 is fitted onto the connector 34 so that the barrel portion 38 of the element 36 extends through the aperture 46. The first plate and the connector element 36 are moved towards the second plate 52, and this movement causes the sleeve 42 to collapse axially and expand radially as seen in FIGS. 8 and 9. The fasteners 50 are inserted through the apertures 48 and threaded into the apertures 66 of the second plate 52 to hold the jig in assembly and the sleeve 42 in its radially expanded condition.

Using a forceps, a hook element or any other suitable tool (not shown), the hook up wires 30 are pulled through the sleeve 42 to the connector element 36 and outwardly of the sleeve 42 through openings in its mesh. Similarly, the bundles 24 are pulled through the sleeve 42 and outwardly through openings in the mesh adjacent the connector element 36.

The fasteners 50 may now be removed to allow the sleeve 42 to return to its normal length and the first plate 44 is removed. The screws 72 are removed, and the T-shaped element 57 slid away from the u-shaped element 53 to allow the assembly of the cable 10 and connector 34 to be removed from the jig.

With the sleeve 42 extended but not tensioned as seen in FIG. 11, the Kellems grip connector 34 is moved over the cable 10 until its connector element 36 is closely spaced to the washer 28 and the sleeve 42 extends over the taped portion of the cable. The bundles 24 ar looped about the intersections of the wires of the mesh in the sleeve 42 in the manner diagrammatically shown in FIG. 12 and are led under the sleeve 42 away from the connector element 36. The bundles 24 are then looped about the wires of the sleeve 42 and led under the sleeve for two wire intersections, after which the excess length is cut.

As best seen in FIGS. 12 and 13, the hook up wires 30 are bent 180 degrees about the sleeve 42 and soldered to the wires of the sleeve 42, either before or after the looping of the bundles 24. The resultant structure is illustrated in FIGS. 12-14.

Following this step, thermoplastic resin tape 26 is wrapped around the sleeve 42 to a diameter slightly greater than the outer diameter of the outer sheath 12. The wrapped cable end is then placed in a mold (not shown) and heat and pressure are applied to cause the resin of the tape 26 to melt flow into a continuous sheath extending from (and bonded to) the original sheath 12 to the connector element 36. The resultant cable end is seen in FIG. 15.

As will be readily appreciated, the encasing resin for the connector to form the continuous outer sheath may be provided by the tape as shown and described, by a sleeve, by liquid resin formulations, or the like. The material employed should be one which may be molded easily to provide the continuation of the outer sheath, and exhibit good resistance to the environment. Polyolefins and particularly polyethylene foam materials have been found quite satisfactory.

It will be understood that many additional changes in the details, materials, steps and arrangement of part, which have been herein described and illustrated in order to explain The nature of the invention, may be made by those skilled in the art within the principle and scope of the invention as expressed in the appended claims.

Thus, it can be seen from the foregoing detailed specification that the jig of the present invention facilitates the forming of a Kellems grip connection which has high strength and exhibits desirable electrical properties The jig may be fabricated easily and economically, and it is simple to use.

What is claimed is:

1. In the method for assembling a Kellems grip connector on a coaxial cable having a conductive core, a metallic braid thereabout, synthetic resin reinforcing strands outwardly of said braid, and an outer sheath, the steps comprising:

removing a length of the outer sheath from an end portion of the cable to be provided with the connector, to expose the metallic braid and reinforcing strands;

forming said exposed strands into a multiplicity of bundles spaced about the periphery of said core and folding said bundles upon themselves to extend away from said end of said cable;

sliding over said exposed core, a Kellems grip connector having a connector element at its outer end and a cylindrical mesh compression sleeve formed by interlaced wires, said mesh sleeve extending over said washer and bundles of strands;

placing the end portion of said cable with said Kellems grip connector thereon in a jig having a pair of members spaced axially along said cable end portion, said placing seating said Kellems grip connector element in an aperture in one of said members and seating the end portion of said cable in an aperture in the other of said members, said placing also seating the end of said sleeve on seating means on the face of said other member;

moving said one member towards said other member to a position in which said sleeve is collapsed axially and thereby its diameter is expanded and securing such members in such collapsing position;

feeding said bundles of reinforcing strands within said expanded sleeve towards said one member and outwardly through peripherally spaced openings in said mesh sleeve adjacent said connector element;

releasing said pair of members of said jig from engagement and removing said cable and Kellems grip connector therefrom;

looping each one of said bundles about a peripherally spaced intersection of the wires of said mesh sleeve adjacent said connector element and feeding each axially under said mesh sleeve towards the end thereof spaced from said connector element; and looping each one of said bundles about a peripherally spaced wire of said mesh sleeve adjacent said spaced end thereof, whereby said bundles of reinforcing strands are firmly interengaged with said mesh sleeve of said Kellems grip connector.

2. The method of assembling a Kellems grip connector in accordance with claim 1 wherein prior to said step of placing said Kellems grip connector thereon, there is included the step of placing a metallic washer over said exposed core and conductively bonding said metallic braid thereto.

3. The method of assembling a Kellems grip connector in accordance with claim 11 wherein said other member of said jig is assembled by relative movement into abutting relationship of a pair of elements about said cable, said elements cooperatively defining the aperture therethrough.

4. The method of assembling a Kellems grip connector in accordance with claim 3 wherein said members and elements of said jig are respectively secured in assembly by releasable interengaging fastening means.

5. A jig for use in assembling a Kellems grip connector on the end of a coaxial cable comprising:

a first member having an aperture therethrough;

a second member formed by a pair of abutting first and second cooperating elements having aligned recesses in the opposed edges thereof which cooperatively define an aperture therethrough, said elements having cooperating means on their faces opposed to said first member and extending about said recesses for seating the end of the collapsible sleeve of a Kellems grip connector, and means for releasably securing said cooperating elements in abutting assembly, said first and second elements of said second member having cooperating configurations permitting their abutting engagement and their disassembly by motion of one relative to the other in a direction parallel to the plane of said first member, one of said elements having a body portion and pair of laterally extending legs, and the other of said elements seats on said legs and has a rail portion extending therebetween; and means for releasably securing said first and second members in assembly with said apertures thereof in alignment, whereby a Kellems grip connector may be seated in said aperture of said first member and the remote end of its sleeve seated on said seating means of said second member with the cable extending through said aperture of said second member, said fastening means being adapted to space said members apart a distance which will collapse the sleeve of the associated Kellems grip connector seated therebetween.

6. The jig in accordance with claim 5 wherein said legs are of lesser thickness than said body portion said other element has wing portions on the sides of said rail portion which are of lesser thickness and which slidably seat on said legs.

7. The jig in accordance with claim 6 wherein said one element is of generally U-shaped configuration and wherein said second element has a T-shaped cross section cooperating therewith.

8. The jig in accordance with claim 7 wherein the means for securing such cooperating elements in assembly comprises fasteners engaged in said pair of elements.

* * * * *